(12) United States Patent
Fujiwara et al.

(10) Patent No.: US 12,091,035 B2
(45) Date of Patent: Sep. 17, 2024

(54) CONTROL DEVICE AND MOVING OBJECT

(71) Applicant: HONDA MOTOR CO., LTD., Tokyo (JP)

(72) Inventors: Tatsuro Fujiwara, Tokyo (JP); Akiko Sato, Tokyo (JP); Yasushi Shoda, Tokyo (JP); Hiroki Takaku, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 43 days.

(21) Appl. No.: 18/088,289

(22) Filed: Dec. 23, 2022

(65) Prior Publication Data

US 2023/0202503 A1 Jun. 29, 2023

(30) Foreign Application Priority Data

Dec. 27, 2021 (JP) .................................. 2021-213148

(51) Int. Cl.
*B60W 50/14* (2020.01)
*B60W 30/06* (2006.01)

(52) U.S. Cl.
CPC ............ *B60W 50/14* (2013.01); *B60W 30/06* (2013.01); *B60W 2050/146* (2013.01); *B60W 2420/403* (2013.01); *B60W 2420/54* (2013.01); *B60W 2540/215* (2020.02)

(58) Field of Classification Search
CPC .................. B60W 50/14; B60W 30/06; B60W 2050/146; B60W 2420/403; B60W 2420/54; B60W 2540/215; G05D 1/0246; B62D 15/0285
See application file for complete search history.

(56) References Cited

U.S. PATENT DOCUMENTS

| | | | | |
|---|---|---|---|---|
| 2017/0369078 A1* | 12/2017 | Freistadt | ............... | B60W 30/06 |
| 2019/0039606 A1* | 2/2019 | Fujita | .................... | B60W 50/14 |
| 2019/0071070 A1* | 3/2019 | Kato | .................. | B62D 15/0285 |
| 2020/0398826 A1* | 12/2020 | Tsujino | .................. | B60K 35/00 |
| 2023/0205405 A1* | 6/2023 | Fujiwara | ............. | G06F 3/04842 |
| | | | | 715/771 |

FOREIGN PATENT DOCUMENTS

JP 2015-074259 A 4/2015

* cited by examiner

*Primary Examiner* — Ryan W Sherwin
(74) *Attorney, Agent, or Firm* — Paratus Law Group, PLLC

(57) ABSTRACT

A control device includes: a display control unit configured to display a candidate position image, indicating a candidate position that is a candidate of a target position, on a display device when the candidate position is detected based on a detection result of an external sensor provided in a moving object; and a reception unit configured to receive an operation of selecting a candidate position image indicating a candidate position to be set as the target position from among a plurality of candidate position images when the plurality of candidate position images are displayed on the display device. When any one of the candidate position images is selected, the display control unit displays a movement pattern image, representing a movement pattern executable by the moving object when the candidate position indicated by the candidate position image is set as the target position, on the display device.

8 Claims, 12 Drawing Sheets

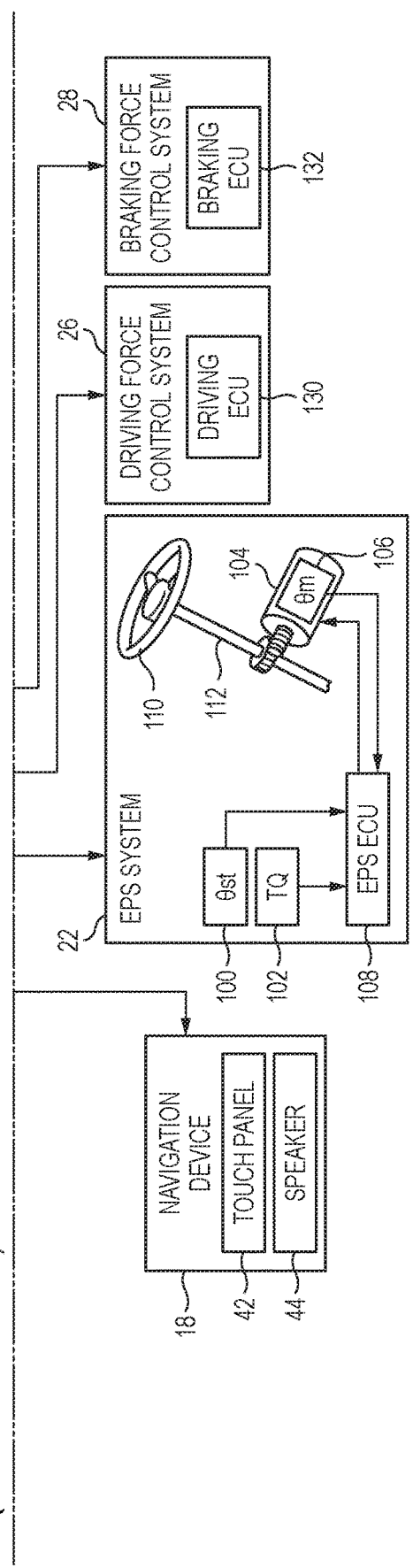

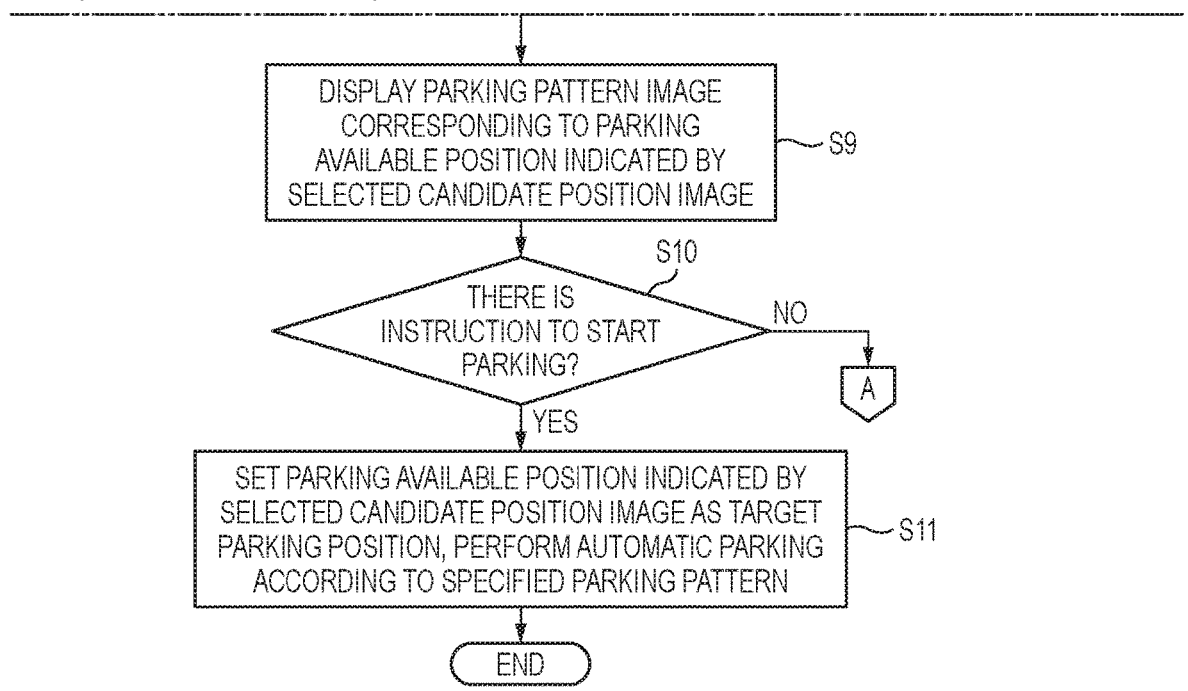

CONTROL DEVICE AND MOVING OBJECT

CROSS-REFERENCE TO RELATED APPLICATIONS

The present application claims the benefit of priority of Japanese Patent Application No. 2021-213148, filed on Dec. 27, 2021, the content of which is incorporated herein by reference.

TECHNICAL FIELD

The present disclosure relates to a control device and a moving object including the control device.

BACKGROUND ART

In recent years, it is required to improve traffic safety in order to make cities and human settlements inclusive, safe, resilient and sustainable. From the viewpoint of improving traffic safety, driving support techniques and automatic driving techniques for moving objects (for example, vehicles) have been developed. For example, JP-A-2015-074259 discloses a technique in which, when a user selects an automatic steering start button on a left side, parking by automatic steering is started while a target parking position corresponding to a candidate position image on the left side is set, whereas, when the user selects an automatic steering start button on a right side, parking by automatic steering is started while a target parking position corresponding to a candidate position image on the right side is set.

Among users of a moving object that moves to a target position by automatic steering, there are users who wish to determine the target position in preference to a movement pattern when the moving object moves to the target position. In order to meet a demand of such users, it is conceivable to allow each user to specify the target position in preference to the movement pattern. However, in related art, in such a case, the user may not be capable of grasping the movement pattern when the moving object moves to the target position specified by the user.

SUMMARY

The present disclosure provides a control device and a moving object including the control device, which enable a user to grasp a movement pattern when the moving object moves to a target position specified by the user.

According to a first aspect of the present disclosure, there is provided a control device configured to control a display device mounted on a moving object that is moved by automatic steering to a target position specified by a user, the moving object being configured to be movable according to a plurality of types of movement patterns, and moving according to a movement pattern corresponding to the target position among the plurality of types of movement patterns when moving to the target position, the control device including: a display control unit configured to display a candidate position image, indicating a candidate position that is a candidate of the target position, on the display device when the candidate position is detected based on a detection result of an external sensor provided in the moving object; and a reception unit configured to receive an operation of selecting a candidate position image indicating a candidate position to be set as the target position from among a plurality of candidate position images when the plurality of candidate position images are displayed on the display device, where: when any one of the candidate position images is selected, the display control unit displays a movement pattern image, representing the movement pattern executable by the moving object when the candidate position indicated by the candidate position image is set as the target position, on the display device.

According to a second aspect of the present disclosure, there is provided a moving object including: the control device according to the first aspect; the display device; and the external sensor, in which the moving object is configured to be moved by automatic steering to the target position.

According to the present disclosure, it is possible to provide the control device and the moving object including the control device, which enable a user to grasp a movement pattern when the moving object moves to a target position specified by the user.

DESCRIPTION OF EMBODIMENTS

Figure 1:
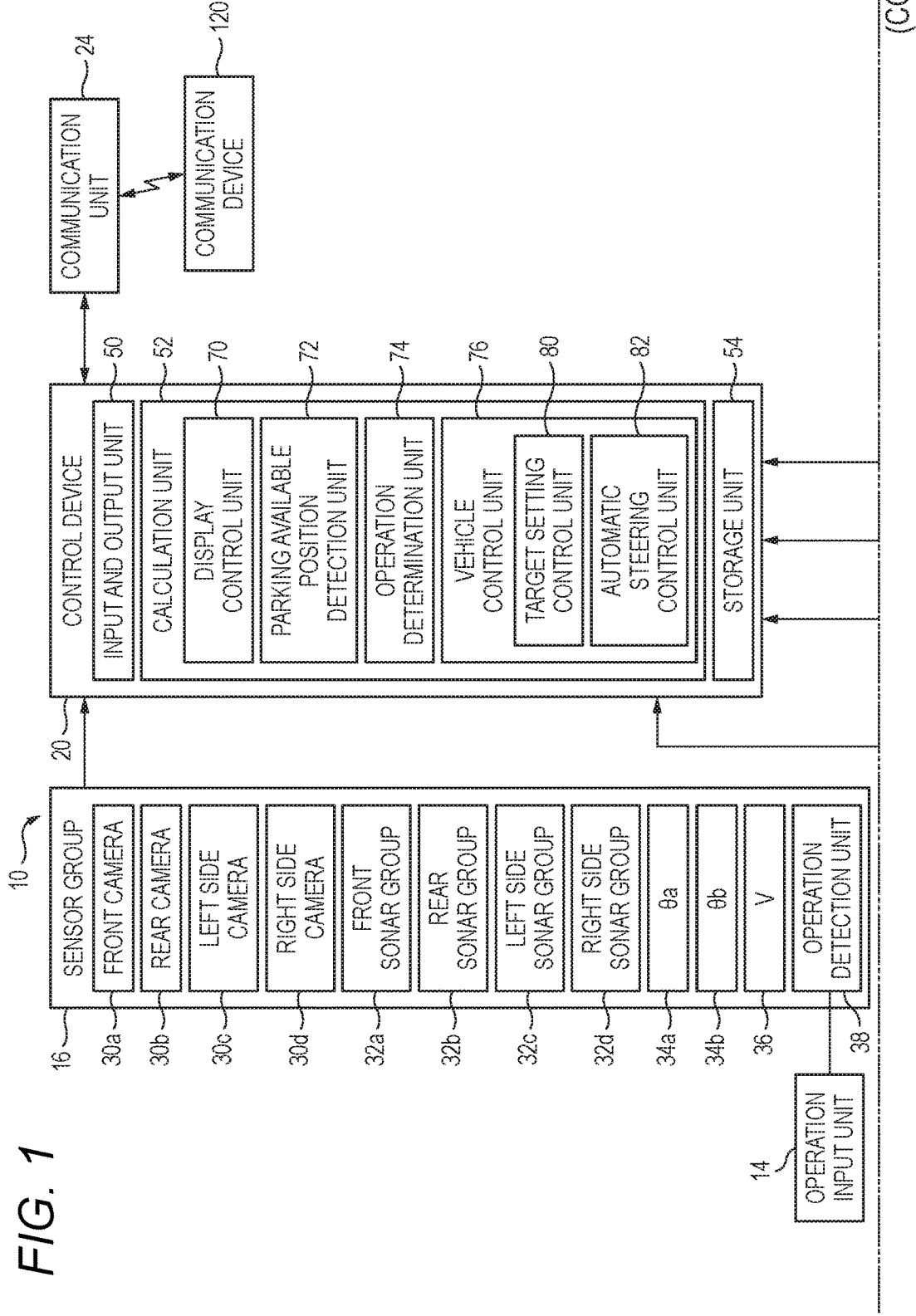
FIG. 1 is a block diagram showing a schematic configuration of a vehicle including a control device according to an embodiment.

Hereinafter, an embodiment of a control device according to the present disclosure and a moving object including the control device will be described in detail with reference to the drawings. Hereinafter, an embodiment in which the moving object according to the present disclosure is a vehicle will be described. In the present specification and the like, in order to simplify and clarify the description, directions such as front, rear, left, right, up, and down are described according to directions viewed from a driver of the vehicle. In addition, in the following description, the same or similar elements are denoted by the same or similar reference numerals, and the description thereof may be omitted or simplified as appropriate.

[Vehicle]

A vehicle 10 according to the present embodiment is an automobile including a driving source, and wheels (all not shown) including driving wheels driven by power of the driving source and steerable wheels that are steerable. For example, the vehicle 10 is a four-wheeled automobile including a pair of left and right front wheels and a pair of left and right rear wheels. The driving source of the vehicle 10 may be an electric motor, an internal combustion engine such as a gasoline engine or a diesel engine, or a combination of an electric motor and an internal combustion engine. In addition, the driving source of the vehicle 10 may drive the pair of left and right front wheels, the pair of left and right rear wheels, or four wheels, that is, the pair of left and right front wheels and the pair of left and right rear wheels. One of the front wheels and the rear wheels may be steerable wheels that are steerable, or the front wheels and the rear wheels may both be steerable wheels that are steerable.

The vehicle 10 is configured to be movable by automatic steering to a target position specified by a user. As the target position, for example, a parking available position where the vehicle 10 can be parked may be set. That is, the vehicle 10 is configured to be capable of being parked by automatic steering at a parking available position specified by the user. In addition, at this time, the vehicle 10 moves to the parking available position according to a parking pattern corresponding to the parking available position (that is, the target position) specified by the user from among a plurality of types of parking patterns. Here, the parking pattern defines a movement mode in which the vehicle 10 is moved to the parking available position (that is, the target position). Examples of the plurality of types of parking patterns include a forward parking pattern in which the vehicle 10 is parked forward with respect to the parking available position that is the target position, a backward parking pattern in which the vehicle 10 is parked backward with respect to the parking available position that is the target position, and a parallel parking pattern in which the vehicle 10 is parked in parallel with respect to the parking available position that is the target position. The forward parking pattern is an example of a first movement pattern, the backward parking pattern is an example of a second movement pattern, and the parallel parking pattern is an example of a third movement pattern.

The parking pattern corresponding to each parking available position is set in advance in, for example, a control device (for example, a control device 20 to be described later) that controls the vehicle 10. This setting may be performed by, for example, a manufacturer of the vehicle 10, or may be performed by the user of the vehicle 10 (for example, an occupant of the vehicle 10 including a driver, hereinafter, may also be simply referred to as a "user"). In addition, the control device that controls the vehicle 10 may appropriately derive and set the parking pattern corresponding to the parking available position based on an image analysis result of a landscape around the parking available position or the like.

As shown in FIG. 1, the vehicle 10 includes a sensor group 16, a navigation device 18, the control device 20, an electric power steering system (EPS system) 22, a communication unit 24, a driving force control system 26, and a braking force control system 28.

The sensor group 16 acquires various detection values related to the vehicle 10 or surroundings of the vehicle 10. The detection values acquired by the sensor group 16 are provided, for example, for parking assistance of the vehicle 10. Here, the parking assistance means to park the vehicle by automatic steering at a parking available position specified by the user. For example, the parking assistance includes a step of detecting a parking available position where the vehicle 10 can be parked, a step of displaying the detected parking available position (that is, presenting the detected parking available position to the user), a step of setting the parking available position as a target position (hereinafter, also referred to as a "target parking position") w % ben one of displayed parking available positions is selected by the user, and a step of moving the vehicle 10 by automatic steering to the set target parking position (that is, parking the vehicle 10 at the target parking position by automatic steering).

The sensor group 16 includes a front camera 30a, a rear camera 30b, a left side camera 30c, a right side camera 30d, a front sonar group 32a, a rear sonar group 32b, a left side sonar group 32c, and a right side sonar group 32d. The cameras and the sonar groups can function as an external sensor that acquires information on the surroundings of the vehicle 10.

The front camera 30a, the rear camera 30b, the left side camera 30c, and the right side camera 30d output, to the control device 20, image data of surrounding images obtained by capturing images of the surroundings of the vehicle 10. The surrounding images captured by the front camera 30a, the rear camera 30b, the left side camera 30c, and the right side camera 30d are referred to as a front image, a rear image, a left side image, and a right side image, respectively. An image formed by the left side image and the right side image is also referred to as a side image.

The front sonar group 32a, the rear sonar group 32b, the left side sonar group 32c, and the right side sonar group 32d emit sound waves to the surroundings of the vehicle 10 and receive reflected sounds from other objects. The front sonar group 32a includes, for example, four sonars. The sonars constituting the front sonar group 32a are respectively provided at an obliquely left front side, a front left side, a front right side, and an obliquely right front side of the vehicle 10. The rear sonar group 32b includes, for example, four sonars. The sonars constituting the rear sonar group 32b are respectively provided at an obliquely left rear side, a rear left side, a rear right side, and an obliquely right rear side of the vehicle 10. The left side sonar group 32c includes, for example, two sonars. The sonars constituting the left side sonar group 32c are provided in the front of a left side portion of the vehicle 10 and in the rear of the left side portion, respectively. The right side sonar group 32d includes, for example, two sonars. The sonars constituting the right side sonar group 32d are provided in the front of a right side portion of the vehicle 10 and in the rear of the right side portion, respectively.

The sensor group 16 further includes wheel sensors 34a and 34b, a vehicle speed sensor 36, and an operation detection unit 38. Each of the wheel sensors 34a and 34b detects a rotation angle of a wheel (not shown). The wheel sensors 34a and 34b may be implemented by angle sensors or displacement sensors. The wheel sensors 34a and 34b output detection pulses each time the wheel rotates by a predetermined angle. The detection pulses output from the wheel sensors 34a and 34b can be used to calculate the rotation angle of the wheel and a rotation speed of the wheel. A movement distance of the vehicle 10 can be calculated based on the rotation angle of the wheel. The wheel sensor 34a detects, for example, a rotation angle 9a of the left rear wheel. The wheel sensor 34b detects, for example, a rotation angle θb of the right rear wheel.

The vehicle speed sensor 36 detects a traveling speed of a vehicle body (not shown) of the vehicle 10, that is, a vehicle speed V, and outputs the detected vehicle speed V to the control device 20. The vehicle speed sensor 36 detects the vehicle speed V based on, for example, rotation of a countershaft of a transmission.

The operation detection unit 38 detects contents of an operation performed by the user by using an operation input unit 14, and outputs the detected contents of the operation to the control device 20. The operation input unit 14 may include, for example, an operation button that receives an operation of executing parking assistance. The operation input unit 14 may be shared with a touch panel 42 to be described later. In addition, the operation input unit 14 may include a shift lever (a select lever, a selector) that is used when switching between forward movement and backward movement of the vehicle 10.

The navigation device 18 detects a current position of the vehicle 10 by using, for example, a global positioning system (GPS), and guides the user along a route toward a destination. The navigation device 18 includes a storage device (not shown) that includes a map information database.

The navigation device 18 includes the touch panel 42 and a speaker 44. The touch panel 42 functions as an input device that receives input of various types of information input to the control device 20 and a display device that is controlled by the control device 20. That is, the user can input various commands to the control device 20 via the touch panel 42. In addition, various screens are displayed on the touch panel 42. As an example, a screen related to parking assistance (hereinafter, also referred to as a "parking assistance screen PS") is displayed on the touch panel 42. The parking assistance screen PS will be described later.

The speaker 44 outputs various types of guidance information to the user by voice. As an example, at the time of parking assistance, voice guidance may be performed via the speaker 44. Specifically, when movement by automatic steering to the target parking position is started, the start of the movement of the vehicle 10 may be guided by voice via the speaker 44. That is, the speaker 44 may function as a notification unit that notifies an occupant of the vehicle 10 that the movement of the vehicle 10 is started by automatic steering.

The control device 20 integrally controls the entire vehicle 10. The control device 20 includes, for example, an input and output unit 50, a calculation unit 52, and a storage unit 54. The input and output unit 50 is an interface that inputs and outputs data between the inside and the outside of the control device 20 under control of the calculation unit 52. The storage unit 54 is implemented by, for example, a non-volatile storage medium such as a flash memory, and stores various types of information (for example, data and programs) for controlling an operation of the vehicle 10.

The calculation unit 52 is implemented by, for example, a central processing unit (CPU) or the like, and controls each unit by executing a program stored in the storage unit 54. Accordingly, the parking assistance described above is implemented. For example, when an operation of executing the parking assistance is received via the operation input unit 14 or the like, the calculation unit 52 executes the parking assistance.

As functional units related to the parking assistance, the calculation unit 52 includes a display control unit 70, a parking available position detection unit 72, an operation determination unit 74, and a vehicle control unit 76. The display control unit 70 controls display contents of the touch panel 42. For example, the display control unit 70 displays the parking assistance screen PS on the touch panel 42 along with execution of the parking assistance.

Figure 2:
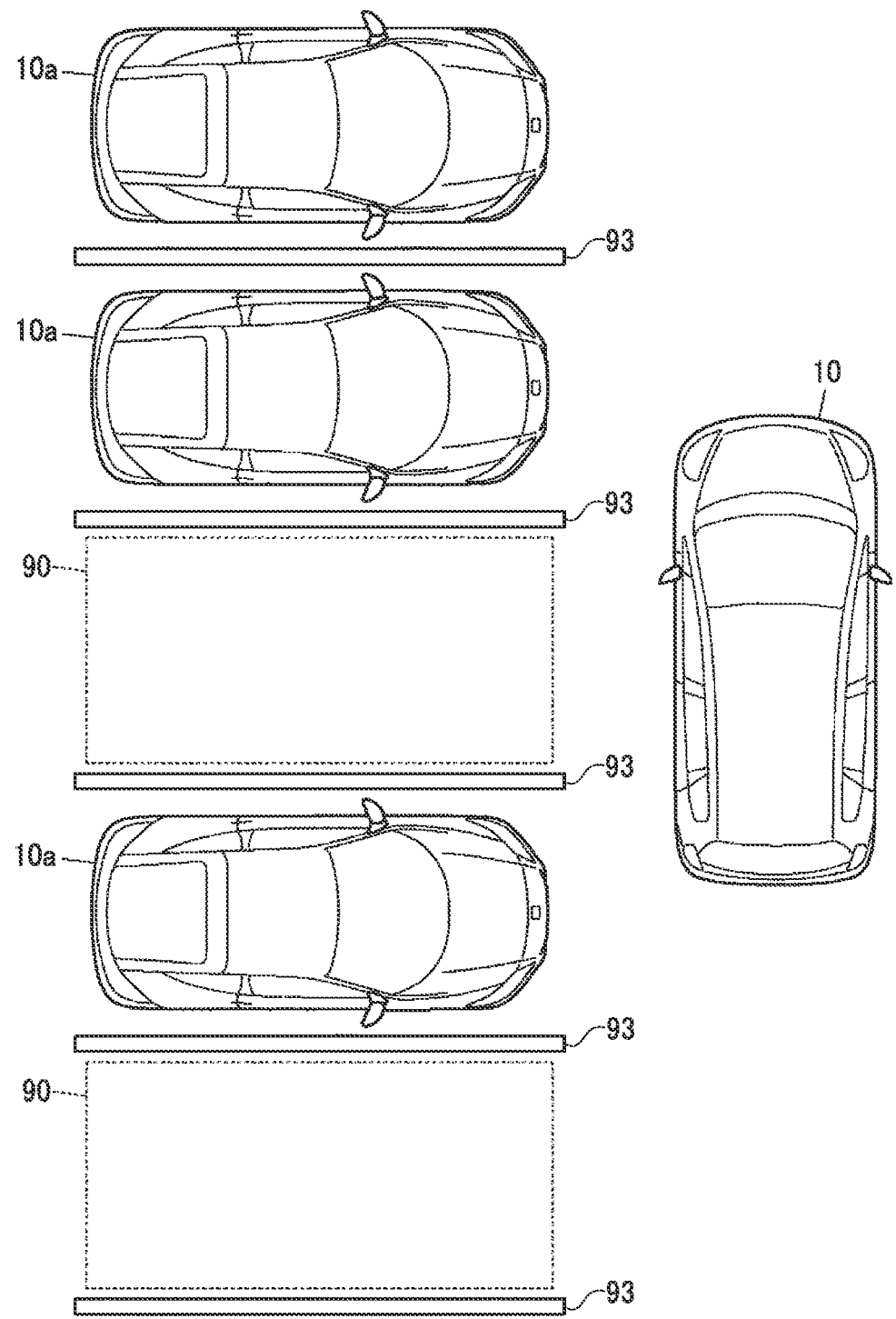
FIG. 2 shows an example of a parking available position.

The parking available position detection unit 72 detects a parking available position where the vehicle 10 can be parked based on a detection result of the sensor group 16 along with the execution of the parking assistance. For example, as shown in FIG. 2, it is assumed that there are five parking spaces partitioned by white lines 93, other vehicles 10a are parked in three parking spaces among the five parking spaces, and no other vehicle 10a is parked in the remaining two parking spaces indicated by reference numerals 90 in FIG. 2. In such a case, the parking available position detection unit 72 detects a parking space where no other vehicle 10a is parked (a parking space indicated by each reference numeral 90 in FIG. 2) as the parking available position.

In addition, the parking available position detection unit 72 may also detect a place other than the parking space partitioned by the white line 93 or the like as the parking available position. As an example, the parking available position detection unit 72 may detect any place that is set as the parking available position by the user as the parking available position. As another example, the parking available position detection unit 72 may detect any place where the vehicle 10 can be physically parked as the parking available position. The parking available position is an example of a candidate position.

When the parking available position is detected by the parking available position detection unit 72, the display control unit 70 displays, on the touch panel 42, a candidate position image (hereinafter, referred to as a "candidate position image GF1") indicating the detected parking available position. The candidate position image GF1 is, for example, a frame image representing an outline of the detected parking available position (see, for example, FIGS. 3 to 5). By displaying the candidate position image GF1 on the touch panel 42, it is possible to guide the user to the parking available position detected by the parking available position detection unit 72.

As will be described in detail later, the display control unit 70 displays, on the touch panel 42, the parking assistance screen PS including a bird eye view image (hereinafter, also referred to as a "bird eye view image PS1") in which the vehicle 10 and the surroundings of the vehicle 10 are viewed from directly above. Then, the display control unit 70 displays the candidate position image GF1 on the bird eye view image PS1. Accordingly, the user can be guided to the parking available position detected by the parking available position detection unit 72 in an intuitive and easy-to-understand manner. The bird eye view image PS1 can be generated from, for example, surrounding images obtained by the front camera 30a, the rear camera 30b, the left side camera 30c, and the right side camera 30d.

Incidentally, a plurality of parking available positions may be detected by the parking available position detection unit 72. In such a case, the display control unit 70 displays, on the touch panel 42, the candidate position image GF1 corresponding to each of the plurality of detected parking available positions. That is, in such a case, the display control unit 70 displays a plurality of candidate position images GF1 on the touch panel 42.

When the plurality of candidate position images GF1 are displayed on the touch panel 42, the operation determination unit 74 receives an operation of selecting a candidate position image GF1 indicating a parking available position to be set as the target parking position from among the plurality of candidate position images GF1. A method of receiving the operation will be described later, and thus detailed description thereof will be omitted here. The operation determination unit 74 is an example of a reception unit.

The vehicle control unit 76 includes a target setting control unit 80 and an automatic steering control unit 82. When the operation determination unit 74 receives the operation of selecting the candidate position image GF1 indicating the parking available position to be set as the target parking position, the target setting control unit 80 sets the parking available position indicated by the candidate position image GF1 selected by the operation as the target parking position.

When the target parking position is set by the target setting control unit 80, the automatic steering control unit 82 determines a parking pattern that can be executed by the vehicle 10 when the vehicle 10 is parked at the target parking position, and automatically operates a steering wheel 110 such that the vehicle 10 reaches the target parking position 92 according to the parking pattern. The automatic operation of the steering wheel 110 is performed by the EPS system 22 controlling an EPS motor 104.

The EPS system 22 includes a steering angle sensor 100, a torque sensor 102, the EPS motor 104, a resolver 106, and an EPS electronic control unit (EPSECU) 108. The steering angle sensor 100 detects a steering angle θst of the steering wheel 110. The torque sensor 102 detects a torque TQ applied to the steering wheel 110.

The EPS motor 104 applies a driving force or a reaction force to a steering column 112 connected to the steering wheel 110, thereby enabling assistance of an operation performed by the driver on the steering wheel 110 and enabling automatic steering at the time of parking assistance. The resolver 106 detects a rotation angle θm of the EPS motor 104. The EPSECU 108 controls the entire EPS system 22. The EPSECU 108 includes an input and output unit, a calculation unit, and a storage unit (all not shown).

The communication unit 24 enables wireless communication with another communication device 120. The other communication device 120 is a base station, a communication device of another vehicle, an information terminal such as a smartphone carried by the user of the vehicle 10, or the like. The control device 20 can communicate with the communication device 120 via the communication unit 24.

The driving force control system 26 includes a driving ECU 130. The driving force control system 26 executes driving force control of the vehicle 10. The driving ECU 130 controls a driving force of the vehicle 10 by controlling an engine or the like (not shown) based on an operation performed on an accelerator pedal (not shown) by the user or an instruction from the control device 20.

The braking force control system 28 includes a braking ECU 132. The braking force control system 28 executes braking force control of the vehicle 10. The braking ECU 132 controls a braking force of the vehicle 10 by controlling a brake mechanism (not shown) or the like based on an operation performed on a brake pedal (not shown) by the user or an instruction from the control device 20.

[Parking Assistance Screen]

Figure 3:
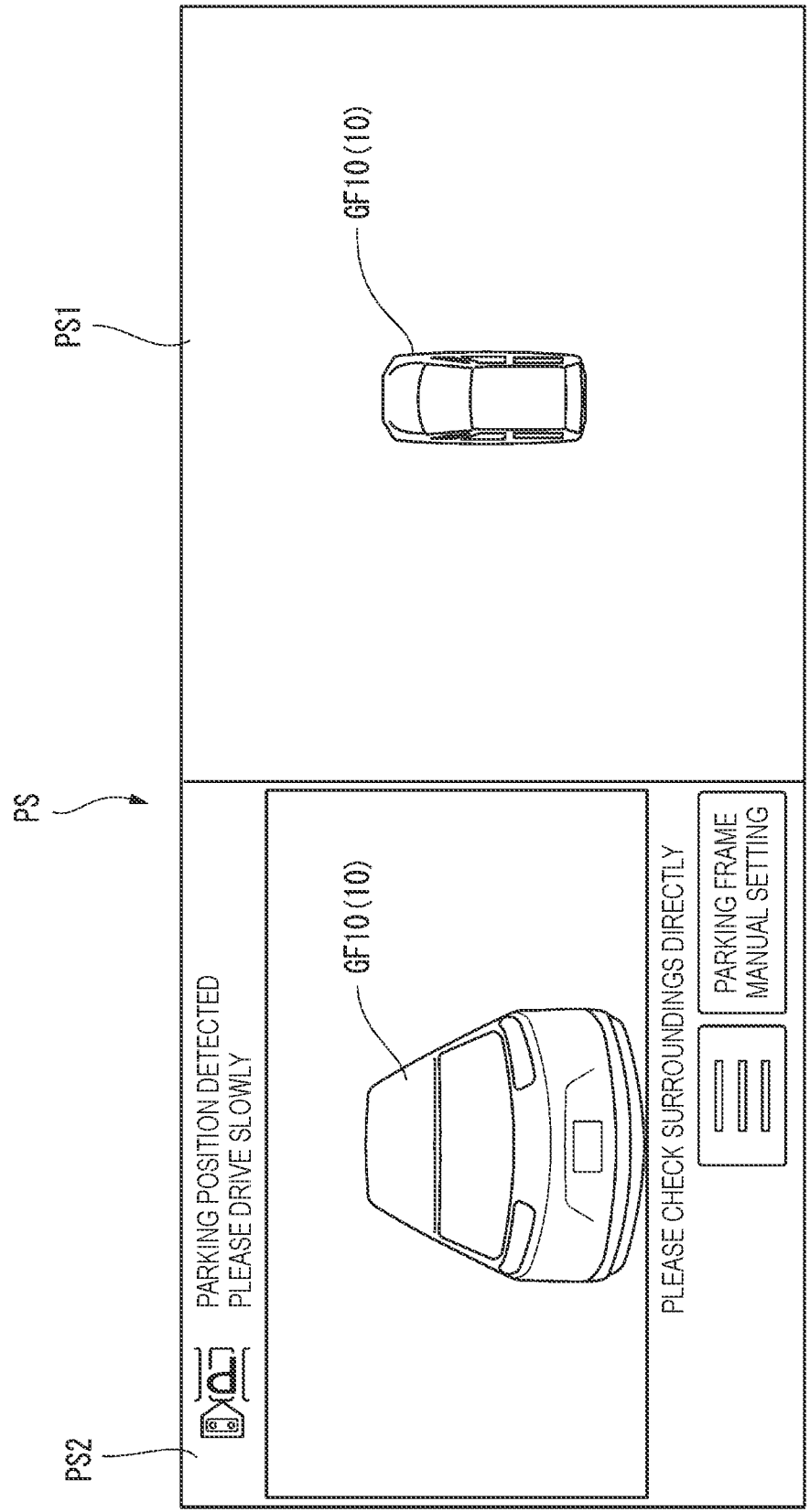
FIG. 3 is a flowchart showing an example of a parking assistance screen displayed when no parking available position is detected.
Figure 4:
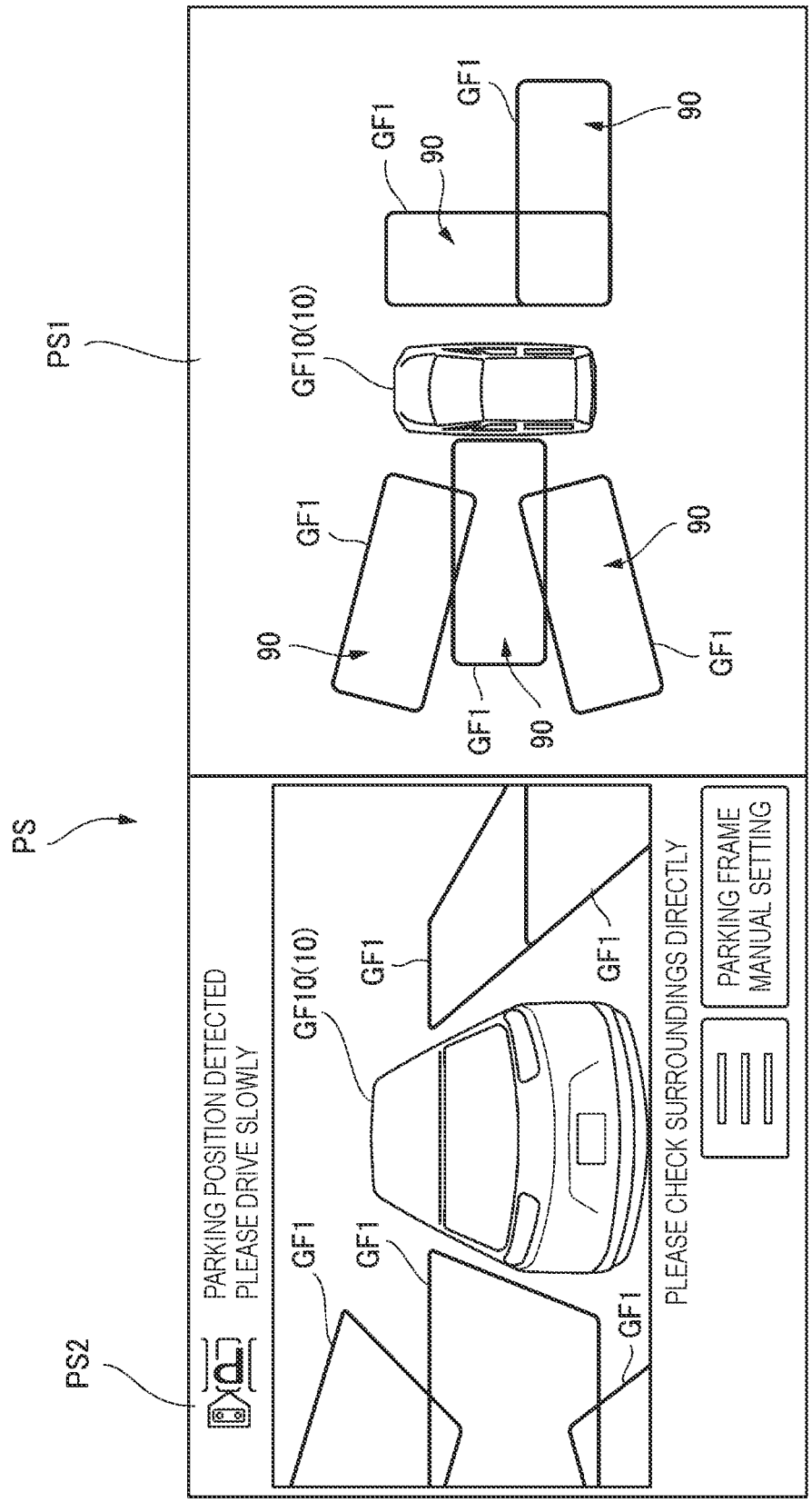
FIG. 4 shows an example of a parking assistance screen displayed when a plurality of parking available positions are detected and none of candidate position images is selected.

Next, a specific example of the parking assistance screen PS will be described with reference to FIGS. 3 to 5. FIG. 3 shows an example of the parking assistance screen PS displayed when no parking available position is detected by the parking available position detection unit 72 (for example, immediately after the execution of the parking assistance is started). In addition, FIG. 4 shows an example of the parking assistance screen PS displayed when a plurality of parking available positions are detected by the parking available position detection unit 72 and none of the candidate position images GF1 is selected. Then, FIG. 5 shows an example of the parking assistance screen PS displayed when a plurality of parking available positions are detected by the parking available position detection unit 72 and one of the candidate position images GF1 is selected.

Figure 5:
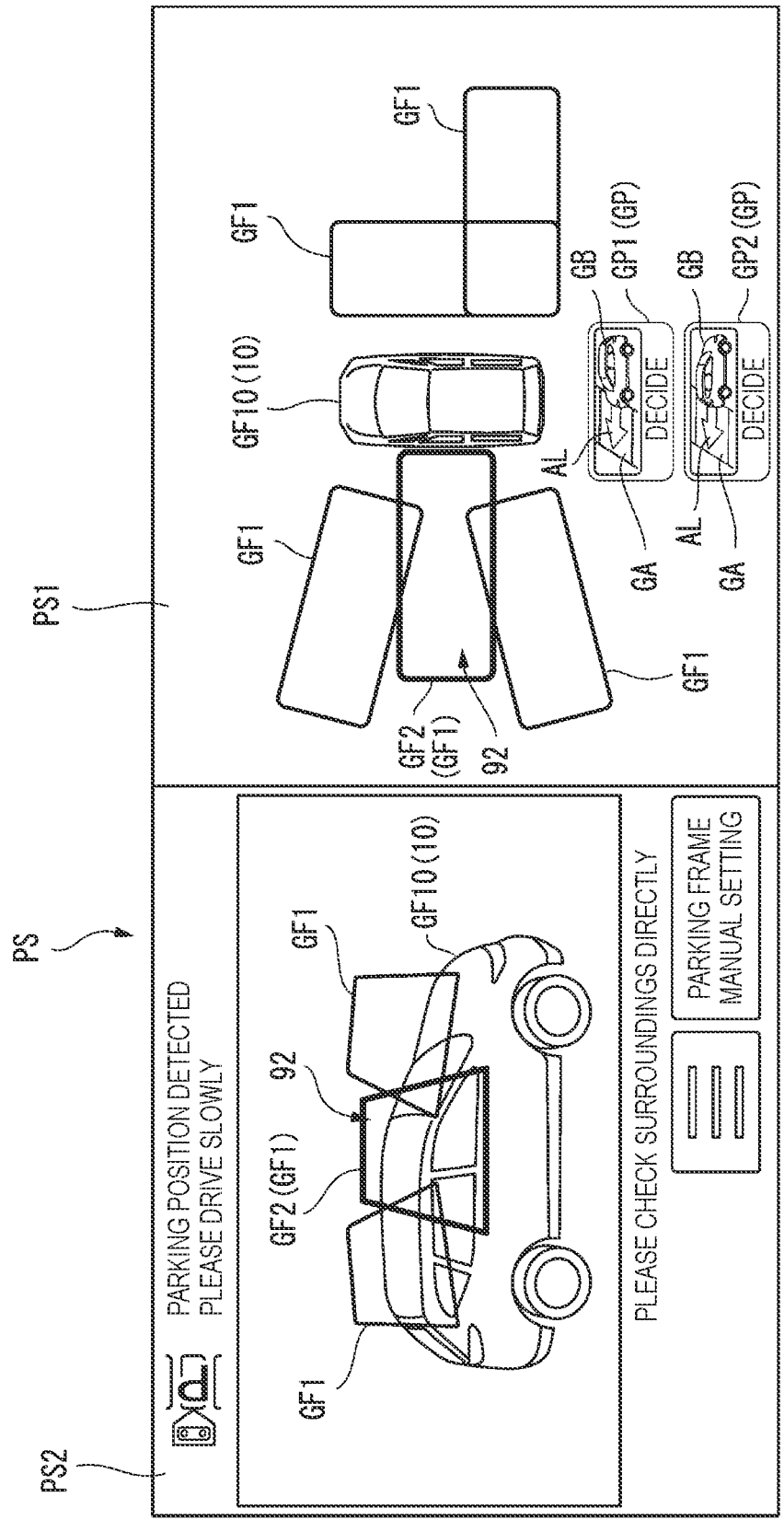
FIG. 5 shows an example of a parking assistance screen displayed when a plurality of parking available positions are detected and one of candidate position images is selected.

As shown in FIGS. 3 to 5, the parking assistance screen PS includes the bird eye view image PS1 and a direction image PS2. As an example, the bird eye view image PS1 is displayed in a region on one of left and right sides in the parking assistance screen PS (a region on a right half in the shown example), and the direction image PS2 is displayed in a region on the other of the left and right sides in the parking assistance screen PS (a region on a left half in the shown example).

As described above, the bird eye view image PS1 is an image in which the vehicle 10 is viewed from directly above. The direction image PS2 is a three-dimensional image virtually showing a space including the vehicle 10 and the surroundings thereof. A viewpoint position of the direction image PS2 is set such that the direction image PS2 is an image including a landscape in a predetermined direction (for example, forward or lateral direction) of the vehicle 10. The direction image PS2 can be generated, for example, by performing image processing of three-dimensionally reconstructing a composite image obtained by combining surrounding images obtained by the front camera 30a, the rear camera 30b, the left side camera 30c, and the right side camera 30d.

As shown in FIG. 3, w % ben no parking available position is detected, no candidate position image GF1 is displayed on the parking assistance screen PS. On the other hand, as shown in FIGS. 4 and 5, when the parking available position is detected, the candidate position image GF1 is displayed on the parking assistance screen PS. For example, it is assumed that the parking available position detection unit 72 detects a plurality of parking available positions 90 around the vehicle 10. In this case, as shown in FIGS. 4 and 5, the bird eye view image PS1 including an own vehicle image GF10 indicating the vehicle 10 and the plurality of candidate position images GF1 indicating the detected parking available positions 90 is displayed.

Specifically, in the example shown in FIGS. 4 and 5, since three parking available positions 90 are detected on the left side of the vehicle 10, three candidate position images GF1 corresponding to these parking available positions 90 are displayed on the left side of the own vehicle image GF10 in the bird eye view image PS1. In addition, in the example shown in FIGS. 4 and 5, since two parking available positions 90 are detected on the right side of the vehicle 10, two candidate position images GF1 corresponding to these parking available positions 90 are displayed on the right side of the own vehicle image GF10 in the bird eye view image PS1.

As shown in FIGS. 4 and 5, when the detected parking available position 90 is present in the direction represented by the direction image PS2, the candidate position image GF1 indicating the parking available position 90 is also displayed in the direction image PS2. Accordingly, display contents of the bird eye view image PS1 and the direction image PS2 can be consistent.

It is assumed that, when the plurality of candidate position images GF1 are displayed in this manner, the user performs an operation of selecting one candidate position image GF1 among the plurality of candidate position images GF1. In this case, as shown in FIG. 5, one of the plurality of candidate position images GF1 is highlighted as a selected candidate position image GF2 so as to be distinguishable from the other candidate position images GF1. The selected candidate position image GF2 indicates the parking available position 90 set as the target parking position 92. Examples of modes of the highlighting include a mode in which a thickness of an outline of the selected candidate position image GF2 is made thicker than that of the other candidate position images GF1, and a mode in which a display color of the outline of the selected candidate position image GF2 is made different from a display color of the other candidate position images GF1.

In addition, when the user performs the operation of selecting one of the candidate position images GF1, the viewpoint position of the direction image PS2 is set such that the direction represented by the direction image PS2 is a direction in which the parking available position 90 indicated by the selected candidate position image GF2 is present, as shown in FIG. 5. For example, as shown in FIG. 5, when the parking available position 90 indicated by the selected candidate position image GF2 is present on the left side of the vehicle 10, the viewpoint position of the direction image PS2 is set such that the direction image PS2 is an image including a landscape on the left side of the vehicle 10.

In addition, when the user performs the operation of selecting one of the candidate position images GF1, as shown in FIG. 5, a parking pattern image GP is displayed below a position where the own vehicle image GF10 in the bird eye view image PS1 is displayed. The parking pattern image GP includes a first image GA representing the parking available position 90 indicated by the selected candidate position image GF2 (that is, the parking available position 90 that is the target parking position 92), a second image GB representing the vehicle 10, and a third image AL representing a route of the vehicle 10. By a combination of the first image GA, the second image GB, and the third image AL, the parking pattern image GP indicates a parking pattern corresponding to the parking available position 90 indicated by the selected candidate position image GF2. As will be described in detail later, a parking pattern image GP1 indicating the forward parking pattern, a parking pattern image GP2 indicating the backward parking pattern, and a parking pattern image GP3 indicating the parallel parking pattern may be displayed as the parking pattern image GP.

By displaying such a parking pattern image GP below the position where the vehicle 10 (own vehicle image GF10) is displayed in the bird eye view image PS1 displayed on the side opposite to the region in which the direction image PS2 is displayed, it is possible to display the parking pattern image GP in such a manner that a limited display region of the touch panel 42 is effectively utilized.

The user can change the candidate position image GF1 displayed as the selected candidate position image GF2 from one candidate position image GF1 to another candidate position image GF1 by performing a predetermined operation when the selected candidate position image GF2 is displayed, details thereof will be described later. In this way, by changing the candidate position image GF1 displayed as the selected candidate position image GF2, the user can change the parking available position 90 set as the target parking position 92.

[Display Control Process]

Next, an example of a display control process executed by the control device 20 during the execution of the parking assistance will be described with reference to FIGS. 3 to 5 and 7 to 10 according to a flowchart shown in FIG. 6.

Figure 6:
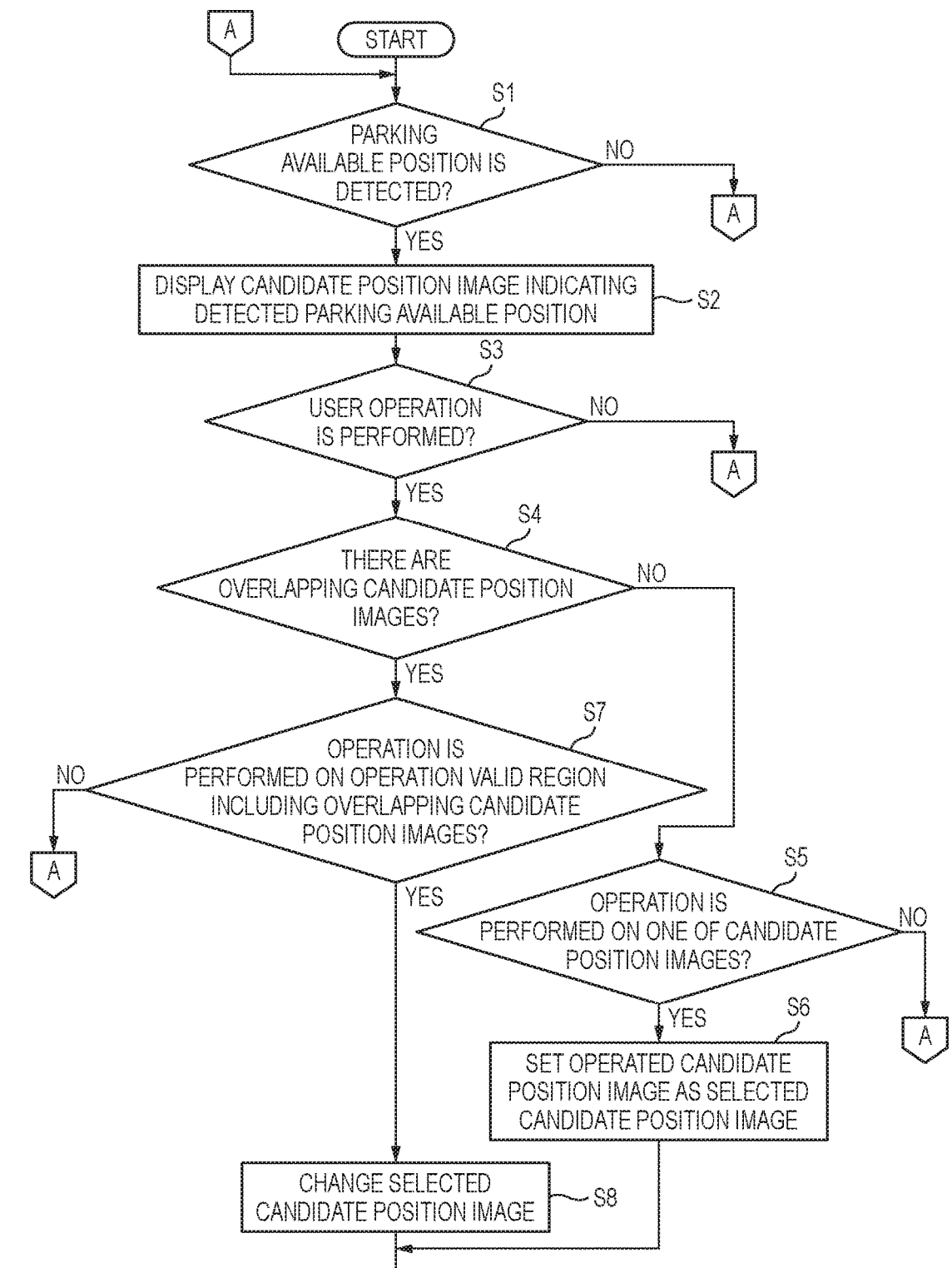
FIG. 6 is a flowchart showing an example of a display control process executed by the control device during execution of parking assistance.

As shown in FIG. 6, the control device 20 determines whether the parking available position 90 is detected (step S1). When no parking available position 90 is detected (step S1: No), the control device 20 repeats the process of step St. At this time, since no parking available position 90 is detected, the control device 20 displays, on the touch panel 42, the parking assistance screen PS on which no candidate position image GF1 is displayed, as shown in FIG. 3.

When it is determined that the parking available position 90 is detected (step S1: Yes), the control device 20 displays, on the touch panel 42, the candidate position image GF1 indicating the detected parking available position 90 (step S2). Accordingly, the parking assistance screen PS on which the candidate position images GF1 are displayed is displayed on the touch panel 42, as shown in FIG. 4.

Next, the control device 20 determines whether the user performs an operation on the touch panel 42 (step S3). In step S3, the control device 20 determines whether there is any operation of selecting one of the candidate position images GF1, in other words, any operation of selecting the candidate position image GF1 indicating the parking available position 90 to be set as the target parking position 92. An example of this operation is an operation (touching) performed on any position as desired in the bird eye view image PS1 on the touch panel 42.

In step S3, when it is determined that there is no operation performed by the user (step S3: No), the control device 20 returns to the process of step S1. On the other hand, when it is determined that there is an operation performed by the user (step S3: Yes), the control device 20 determines whether there are candidate position images GF1 overlapping each other among the candidate position images GF1 displayed on the touch panel 42 (step S4).

When it is determined that there is no overlapping candidate position image GF1 (step S4: No), the control device 20 determines whether the operation of the user performed in step S3 is an operation of selecting one of displayed candidate position images GF1 (step S5). For example, in this case, when the operation of the user is an operation (touching) performed on one of the candidate position images GF1 in the bird eye view image PS1, the control device 20 determines that there is an operation of selecting the candidate position image GF1.

When the operation of the user is not the operation of selecting the candidate position image GF1 (step S5: No), the control device 20 returns to the process of step S1. On the other hand, when the operation of the user is the operation of selecting the candidate position image GF1 (step S5: Yes), the control device 20 sets the selected candidate position image GF1 as the selected candidate position image GF2 (step S6). Accordingly, the parking assistance screen PS on which the candidate position image GF1 is displayed as the selected candidate position image GF2 as shown in FIG. 5 is displayed on the touch panel 42.

On the other hand, when it is determined in step S4 that there are overlapping candidate position images GF1 (step S4: Yes), the control device 20 determines whether the operation of the user performed in step S3 is an operation performed on a predetermined operation valid region (hereinafter, also referred to as an "operation valid region ED") including the overlapping candidate position images GF1 (step S7).

As shown in FIGS. 7 to 10, the operation valid region ED herein is, for example, a rectangular region including a plurality of candidate position images GF1. Accordingly, the operation valid region ED can be easily grasped intuitively by the user.

For example, an upper end, a lower end, a right end, and a left end of the operation valid region ED respectively coincide with upper ends, lower ends, right ends, and left ends of the plurality of candidate position images GF1 in the operation valid region ED. Accordingly, the operation valid region ED can be more easily grasped intuitively by the user. Further, even when the user operates an end portion of one of the candidate position images GF1 in the operation valid region ED, the operation can be reliably received as an operation performed on the operation valid region ED.

In addition, as shown in FIGS. 7 to 10, when a plurality of parking available positions 90 are detected on each of the left and right sides of the vehicle 10 and a plurality of candidate position images GF1 are displayed on each of left and right sides of the own vehicle image GF10 in the bird eye view image PS1, the operation valid regions ED are provided on each of the left and right sides with the vehicle 10 (that is, the own vehicle image GF10) interposed therebetween in the bird eye view image PS1.

Specifically, in the example shown in FIGS. 7 to 10, three overlapping candidate position images GF1 are displayed on the left side of the own vehicle image GF10 in the bird eye view image PS1. Therefore, an operation valid region ED1 including these three candidate position images GF1 is provided on the left side of the own vehicle image GF10. In addition, in the example shown in FIGS. 7 to 10, two overlapping candidate position images GF1 are displayed on the right side of the own vehicle image GF10 in the bird eye view image PS1. Therefore, an operation valid region ED2 including these two candidate position images GF1 is provided on the right side of the own vehicle image GF10. In this way, the candidate position images GF1 and the operation valid regions ED are separately provided on the left side and the right side of the vehicle 10 (that is, the own vehicle image GF10) in the bird eye view image PS1 according to a positional relationship between the vehicle 10 and the parking available positions 90, so that the user can more easily select the desired candidate position image GF1 (to be described later).

In step S7, the control device 20 determines whether the operation of the user performed in step S3 is an operation performed on such an operation valid region ED (an operation to a position corresponding to the operation valid region ED). When it is determined that the operation is not performed on the operation valid region ED (step S7: No), the control device 20 returns to the process of step S1. On the other hand, when it is determined that the operation is performed on the operation valid region ED (step S7: Yes), the control device 20 executes a process of changing the selected candidate position image GF2 (step S8).

Figure 7:
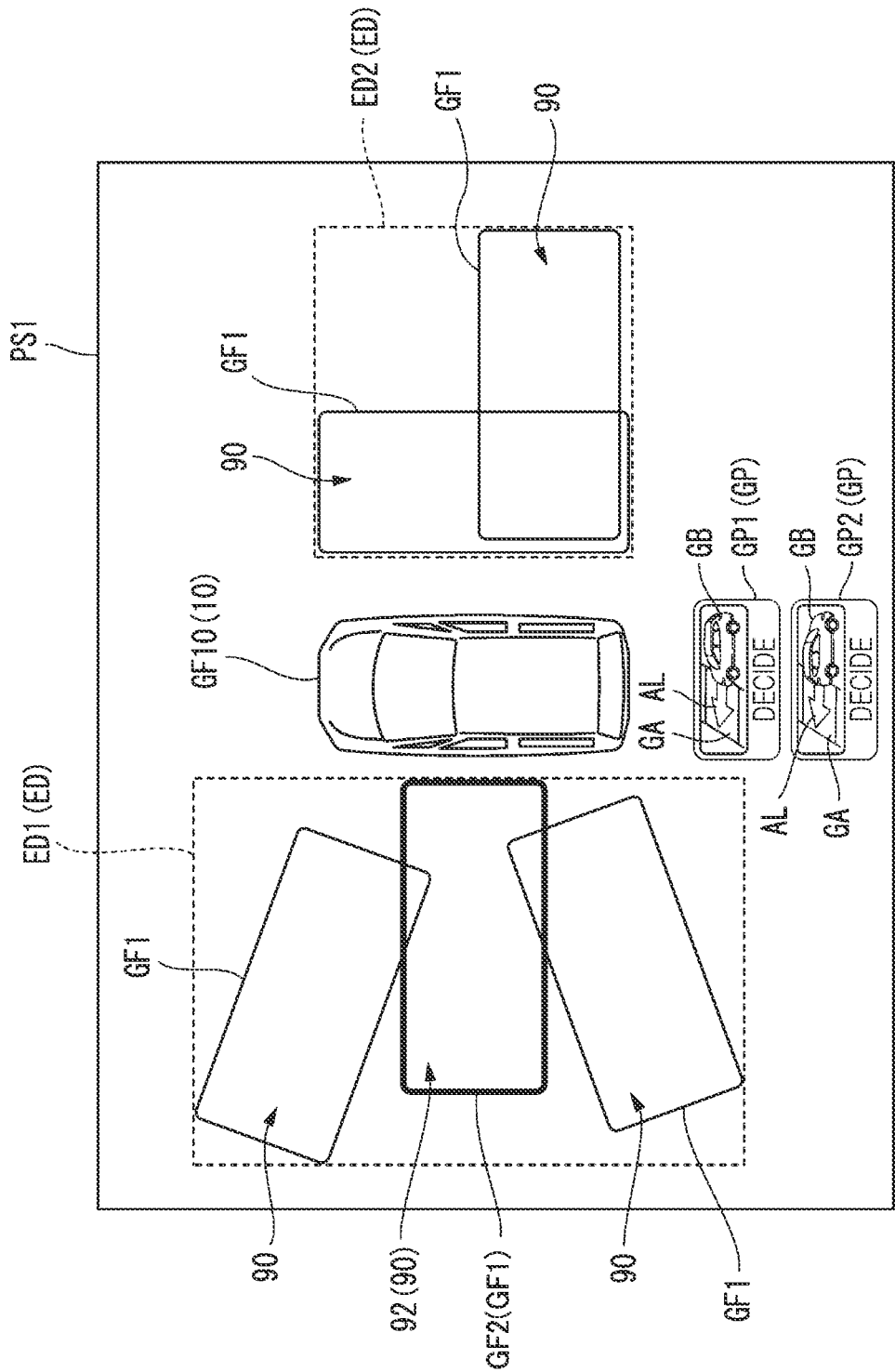
FIG. 7 shows an example of a bird eye view image and an operation valid region (part 1).

For example, it is assumed that there is an operation performed on the operation valid region ED1 in the state shown in FIG. 7, that is, in a state in which the middle candidate position image GF1 among the three candidate position images GF1 in the operation valid region ED1 on the left side is the selected candidate position image GF2. In this case, in the process of step S8, as shown in FIG. 8, the control device 20 changes the selected candidate position image GF2 to one of the other two candidate position images GF1 in the operation valid region ED1 (in the shown example, the candidate position image GF1 closer to the rear of the vehicle 10).

Figure 8:
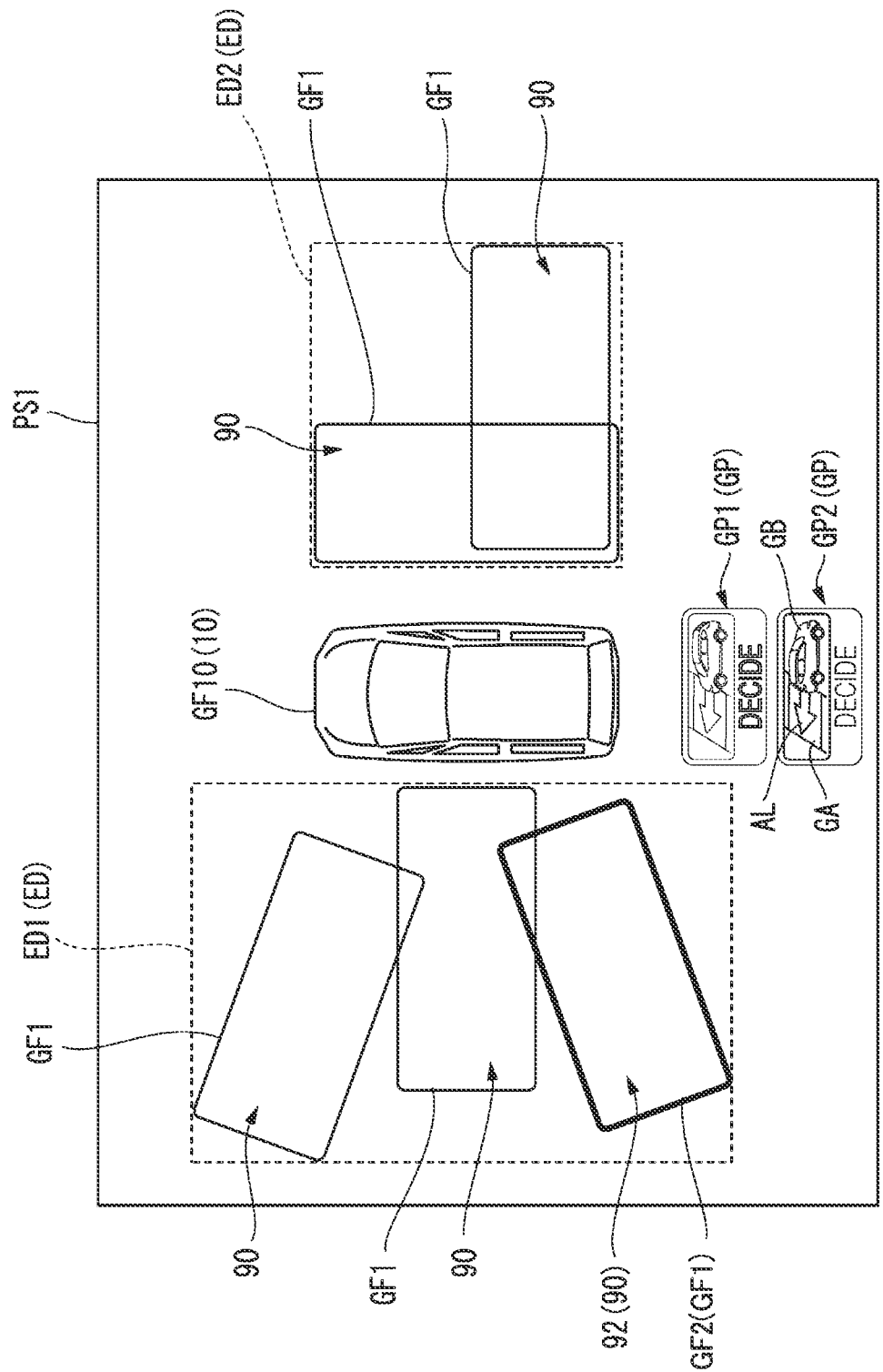
FIG. 8 shows the example of the bird eye view image and the operation valid region (part 2).

In addition, in the state shown in FIG. 8, when the operation performed on the operation valid region ED1 is performed again, the control device 20 changes the selected candidate position image GF2 to the other of the two candidate position images GF1 (the candidate position image GF1 closer to the front of the vehicle 10) in the process of step S8. That is, when an operation is performed on the operation valid region ED1 in a state in which one of the candidate position images GF1 in the operation valid region ED1 is the selected candidate position image GF2, the control device 20 sequentially switches the candidate position image GF1 to be the selected candidate position image GF2 among the candidate position images GF1 in the operation valid region ED1 each time.

Figure 9:
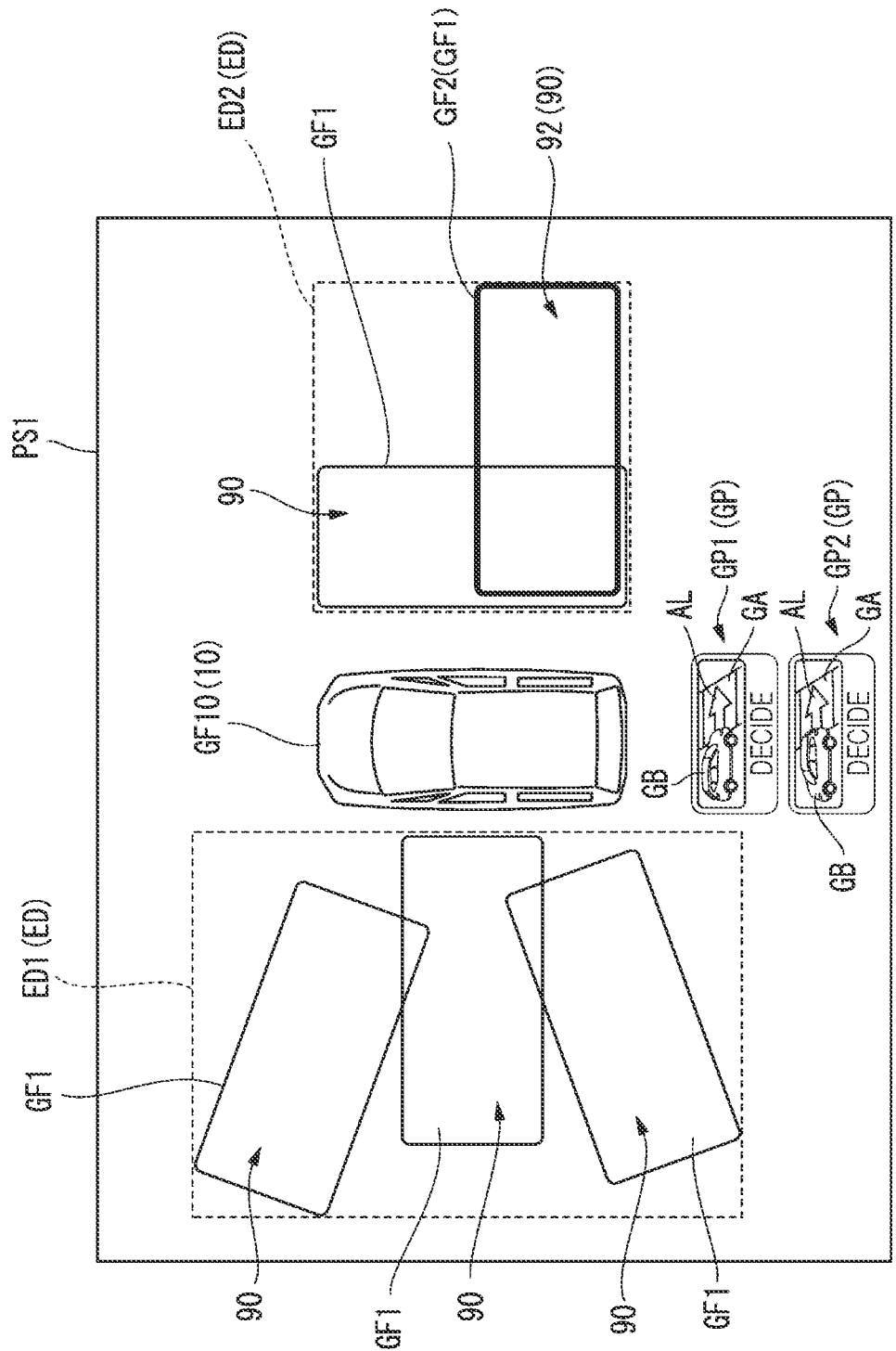
FIG. 9 shows the example of the bird eye view image and the operation valid region (part 3).

On the other hand, for example, in the state shown in FIG. 7, it is assumed that there is an operation performed on the operation valid region ED2 on the right side. In this case, in the process of step S8, as shown in FIG. 9, the control device 20 changes the selected candidate position image GF2 to one of the candidate position images GF1 in the operation valid region ED2 (in the shown example, the candidate position image GF1 indicating the parking available position 90 extending toward the right of the vehicle 10). Accordingly, the user can switch the candidate position image GF1 that can be selected as the selected candidate position image GF2 from the candidate position image within the operation valid region ED1 to the candidate position image within the operation valid region ED2.

Then, in the state shown in FIG. 9, when there is an operation performed on the operation valid region ED2, the control device 20 changes the selected candidate position image GF2 to another candidate position image GF1 in the operation valid region ED2 in the process of step S8. That is, when an operation is performed on the operation valid region ED2 in a state in which one of the candidate position images GF1 in the operation valid region ED2 is the selected candidate position image GF2, the control device 20 sequentially switches the candidate position image GF1 to be the selected candidate position image GF2 among the candidate position images GF1 in the operation valid region ED2 each time.

In this way, when there is an operation performed on the operation valid region ED1 on the left side, the selected candidate position image GF2 is sequentially switched among the plurality of candidate position images GF1 on the left side, and when there is an operation performed on the operation valid region ED2 on the right side, the selected candidate position image GF2 is sequentially switched among the plurality of candidate position images GF1 on the right side. Therefore, even when a plurality of candidate position images GF1 are displayed in an overlapped manner on the left and right sides of the vehicle 10 (own vehicle image GF10) in the bird eye view image PS1, the candidate position image GF1 unwanted by the user is prevented from being selected as the selected candidate position image GF2, and thus selection of the desired candidate position image GF1 is facilitated. For example, when the user intends to select one of the candidate position images GF1 on the left side, the candidate position images GF1 on the right side are not selected as long as the user performs an operation on the operation valid region ED1 on the left side. Therefore, the candidate position images GF1 on the right side unwanted by the user are prevented from being selected, and thus it is possible to easily select one of the candidate position images GF1 on the left side.

In addition, by sequentially changing the selected candidate position image GF2 among the plurality of candidate position images GF1 in the operation valid region ED each time an operation is performed on the operation valid region ED, the user can reliably select the desired candidate position image GF1 by adjusting the number of times of operations performed on the operation valid region ED.

Although the selected candidate position image GF2 is sequentially changed among the plurality of candidate position images GF1 in the operation valid region ED each time an operation is performed on the operation valid region ED herein, the present disclosure is not limited thereto. For example, a configuration may be adopted in which the control device 20 changes the candidate position image GF1 to be the selected candidate position image GF2 to the candidate position image GF1 closest to an operation position among the candidate position images GF1 in the operation valid region ED when there is an operation performed on the operation valid region ED. Here, the candidate position image GF1 closest to the operation position may be the candidate position image GF1 whose center position is closest to the operation position, or may be the candidate position image GF1 whose one side is closest to the operation position. Accordingly, the user can select the candidate position image GF1 in a manner that is easy for the user to intuitively understand.

In addition, for example, when the selected candidate position image GF2 is changed, the control device 20 changes the viewpoint position of the direction image PS2 such that the direction represented by the direction image PS2 becomes a direction in which the parking available position 90 indicated by the changed selected candidate position image GF2 is present. Accordingly, the direction image PS2 changes so as to represent a landscape in the direction in which the parking available position 90 indicated by the changed selected candidate position image GF2 is present. Accordingly, it is possible to guide the user in an intuitive and easy-to-understand manner to the landscape in the direction in which the parking available position 90 that is the target parking position 92 is present.

In addition, when the selected candidate position image GF2 is displayed by executing the process of step S6 or step S8, the control device 20 displays, on the touch panel 42, the parking pattern image GP corresponding to the parking available position 90 indicated by the selected candidate position image GF2 (step S9).

For example, as shown in FIG. 7, it is assumed that the parking available position 90 indicated by the selected candidate position image GF2 is the parking available position 90 where forward parking and backward parking are both possible (parallel parking is not possible). In this case, the control device 20 displays the parking pattern image GP1 indicating the forward parking pattern and the parking pattern image GP2 indicating the backward parking pattern as the parking pattern image GP. In this case, by performing an operation (touching) on the displayed parking pattern image GP1, the user can set the parking available position 90 indicated by the selected candidate position image GF2 as the target parking position 92 and instruct the control device 20 to perform forward parking toward the target parking position 92. In addition, in this case, when the user performs an operation on the displayed parking pattern image GP2, the user can set the parking available position 90 indicated by the selected candidate position image GF2 as the target parking position 92 and instruct the control device 20 to perform backward parking toward the target parking position 92.

On the other hand, as shown in FIG. 8, it is assumed that the parking available position 90 indicated by the selected candidate position image GF2 is the parking available position 90 where only backward parking is possible. In this case, although the control device 20 displays the parking pattern image GP1 and the parking pattern image GP2 as the parking pattern image GP in the same manner as the example shown in FIG. 7, the parking pattern image GP1 representing the inexecutable parking pattern is displayed with, for example, lower lightness than the parking pattern image GP2 representing the executable parking pattern. In this case, even if there is an operation performed on the parking pattern image GP1 representing the inexecutable parking pattern (that is, the parking pattern image displayed with low lightness), the control device 20 does not receive the operation. In this way, the control device 20 displays in such a manner that the parking pattern image (here, the parking pattern image GP2) representing the executable parking pattern in distinguished from the parking pattern image (here, the parking pattern image GP1) representing the inexecutable parking pattern. Instead of or in addition to the lightness, for example, the control device 20 may make transmittance of the parking pattern image representing the executable parking pattern and transmittance of the parking pattern image representing the inexecutable parking pattern different from each other. In this way, the parking pattern image representing the executable parking pattern and the parking pattern image representing the inexecutable parking pattern can still be displayed in a distinguishable manner. Further, for example, the control device 20 may display a mark indicating that selection is not possible (for example, a mark indicating "NG") on the parking pattern image indicating the inexecutable parking pattern so as to distinguish between the parking pattern image indicating the executable parking pattern and the parking pattern image indicating the inexecutable parking pattern.

Figure 10:
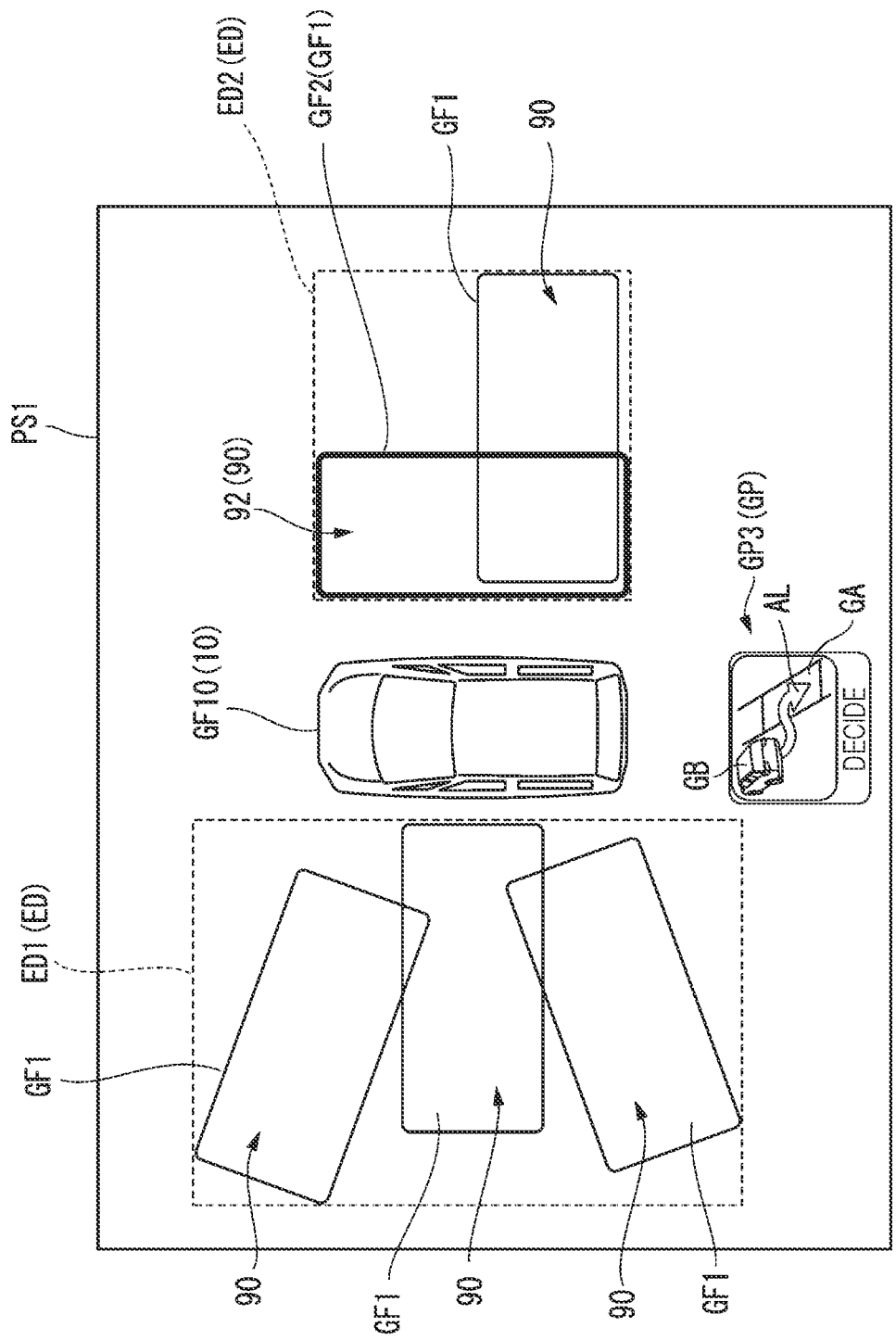
FIG. 10 shows the example of the bird eye view image and the operation valid region (part 4).

In addition, as shown in FIG. 10, it is assumed that the parking available position 90 indicated by the selected candidate position image GF2 is the parking available position 90 where only parallel parking is possible. In this case, the control device 20 displays the parking pattern image GP3 indicating the parallel parking pattern as the parking pattern image GP. In this case, the parking pattern image GP1 and the parking pattern image GP2 are not displayed, and only the parking pattern image GP3 is displayed in a large size.

In this way, the control device 20 can guide the user to the parking pattern by displaying the parking pattern image GP indicating the parking pattern executable when the parking available position 90 indicated by the selected candidate position image GF2 is set as the target parking position 92. Therefore, the user can grasp the parking pattern when the vehicle 10 moves to the target parking position 92 specified by the user.

In addition, when the parking pattern executable for the parking available position 90 indicated by the selected candidate position image GF2 is the parallel parking pattern, the control device 20 displays the parking pattern image GP3 indicating the parallel parking pattern in a display size different from a display size of the parking pattern image GP1 indicating the forward parking pattern and the parking pattern image GP2 indicating the backward parking pattern (for example, the parking pattern image GP3 is displayed in a large size). Accordingly, when the parking available position 90 indicated by the selected candidate position image GF2 is set as the target parking position 92, the user can be guided in an easy-to-understand way that the vehicle 10 is to be parked by parallel parking toward the target parking position 92.

In addition, by displaying the parking pattern image GP representing the parking pattern that cannot be executed for the parking available position 90 indicated by the selected candidate position image GF2 in an unselectable state, the user can be guided to the unselectable parking pattern image GP, and thus the parking pattern indicated by the parking pattern image GP can be prevented from being selected.

As described above, the parking pattern image GP includes the first image GA representing the parking available position 90 indicated by the selected candidate position image GF2, the second image GB representing the vehicle 10, and the third image AL representing the route of the vehicle 10. In the process of step S9, the control device 20 displays the parking pattern image GP in which the first image GA and the second image GB are arranged at positions corresponding to a positional relationship between the vehicle 10 and the parking available position 90 indicated by the selected candidate position image GF2.

For example, in the state shown in FIG. 7, the parking available position 90 indicated by the selected candidate position image GF2 is present on the left side of the vehicle 10. In this way, when the parking available position 90 indicated by the selected candidate position image GF2 is present on the left side of the vehicle 10, as shown in FIG. 7, the control device displays the parking pattern image GP in which the first image GA is arranged on a left side of the second image GB. In this case, the second image GB of the parking pattern image GP1 indicating the forward parking pattern represents vehicle 10 facing leftward. Further, the third image AL of the parking pattern image GP1 is an image of an arrow extending from the second image GB (the vehicle 10 facing leftward) toward the first image GA arranged on the left of the second image GB. In addition, in this case, the second image GB of the parking pattern image GP2 indicating the backward parking pattern represents the vehicle 10 facing rightward. Further, the third image AL of the parking pattern image GP2 is an image of an arrow extending from the second image GB (the vehicle 10 facing rightward) toward the first image GA arranged on the left side of the second image GB.

On the other hand, in the state shown in FIG. 9, the parking available position 90 indicated by the selected candidate position image GF2 is present on the right side of the vehicle 10. In this way, when the parking available position 90 indicated by the selected candidate position image GF2 is present on the right side of the vehicle 10, as shown in FIG. 9, the control device 20 displays the parking pattern image GP that is left-right inverted as compared with the parking pattern image GP shown in FIG. 7.

In this way, by displaying the parking pattern image GP in which the first image GA and the second image GB are arranged at the positions corresponding to the positional relationship between the vehicle 10 and the parking available position 90 indicated by the selected candidate position image GF2, it is possible to display the parking pattern image GP that suits a sense of the user, and thus it is possible to prevent a sense of discomfort from being given to the user due to the displayed parking pattern image GP.

After executing the process of step S9, the control device 20 determines whether there is an instruction to start parking, that is, an operation performed on one of the parking pattern images GP (step S10). When it is determined that there is no instruction to start parking (step S10: No), the control device 20 returns to the process of step S1. On the other hand, when it is determined that there is an instruction to start parking (step S10: Yes), the control device 20 sets the parking available position 90 indicated by the selected candidate position image GF2 as the target parking position 92, moves the vehicle to the target parking position 92 by automatic steering (that is, automatically parks the vehicle) according to the parking pattern indicated by the selected parking pattern image GP (step S11), and ends the series of processes.

As described above, according to the control device 20 according to the present embodiment, even when a plurality of candidate position images GF1 are displayed in the overlapped manner on the touch panel 42, the user can easily select the desired candidate position image GF1. Although an example in which the operation valid region ED including the plurality of candidate position images GF1 is provided when the plurality of candidate position images GF1 are displayed in the overlapped manner has been described in the present embodiment, the present disclosure is not limited thereto. If the plurality of candidate position images GF1 are to some extent densely arranged without overlapping each other, it is conceived that it is difficult for the user to select the desired candidate position image GF1 as in the case where the candidate position images GF1 overlap each other. Therefore, the control device may provide the operation valid region ED including the plurality of candidate position images GF1 not only in the case where the plurality of candidate position images GF1 are displayed in the overlapped manner but also in the case where the plurality of candidate position images GF1 are to some extent densely (that is, at high density) displayed. The manufacturer of the vehicle 10 or the control device 20 can appropriately determine how densely the plurality of candidate position images GF1 are displayed to provide the operation valid region ED including the candidate position images GF1.

In addition, according to the vehicle 10 according to the present embodiment that includes the control device 20, the touch panel 42, and the sensor group 16 and is moved by automatic steering to the target parking position 92, even when the plurality of candidate position images GF1 are displayed on the touch panel 42 in the overlapped manner, the user can easily select the desired candidate position image GF1, and can park the vehicle by the automatic steering (that is, automatically parking) toward the target parking position 92 indicated by the selected candidate position image GF1.

In addition, according to the control device 20 and the vehicle 10 of the present embodiment, the user can grasp the parking pattern when the vehicle is parked by automatic steering toward the target parking position 92 indicated by the selected candidate position image GF1 (that is, the target parking position 92 specified by the user).

Although the embodiment of the present disclosure has been described above, the present disclosure is not limited to the above-described embodiment, and modifications, improvements, and the like can be made as appropriate.

For example, although the touch panel 42 provided in the vehicle 10 is used as the display device in the present disclosure in the above-described embodiment, the present disclosure is not limited thereto. For example, a display device of the communication device 120 implemented by a smartphone or the like carried by the user who is an occupant of the vehicle 10 may be used as the display device in the present disclosure.

In addition, although an example in which the moving object in the present disclosure is the vehicle 10 that is a four-wheeled automobile has been described in the embodiment described above, the present disclosure is not limited thereto. The moving object in the present disclosure may be a two-wheeled automobile (so-called motorcycle), or may be a Segway (registered trademark), a ship, an aircraft, or the like.

In the present specification, at least the following matters are described. It should be noted that although the corresponding constituent elements and the like in the above-described embodiment are shown in parentheses, the present disclosure is not limited thereto.

(1) A control device (control device 20) configured to control a display device (touch panel 42) mounted on a moving object (vehicle 10) that is moved by automatic steering to a target position (target parking position 92) specified by a user, the moving object being configured to be movable according to a plurality of types of movement patterns (parking patterns), and moving according to a movement pattern corresponding to the target position among the plurality of types of movement patterns when moving to the target position, the control device including:

a display control unit (display control unit 70) configured to, when a candidate position that is a candidate of the target position is detected based on a detection result of an external sensor (sensor group 16) provided in the moving object, display a candidate position image (candidate position image GF1) indicating the candidate position on the display device; and a reception unit (operation determination unit 74) configured to receive an operation of selecting a candidate position image indicating a candidate position to be set as the target position from among a plurality of candidate position images when the plurality of candidate position images are displayed on the display device, in which when any one of the candidate position images is selected, the display control unit displays a movement pattern image (parking pattern image GP), representing the movement pattern executable by the moving object when the candidate position indicated by the candidate position image is set as the target position, on the display device.

According to (1), when any one of the candidate position images is selected by the user, it is possible to display the movement pattern image representing the movement pattern executable by the moving object when the candidate position indicated by the candidate position image is set as the target position. Accordingly, the user can be guided to the movement pattern when the candidate position indicated by the selected candidate position image is set as the target position. Therefore, the user can grasp the movement pattern when the moving object moves to the target position specified by the user.

(2) The control device according to (1), in which the movement pattern image includes a first image (first image GA) representing the candidate position and a second image (second image GB) representing the moving object, and the display control unit displays the movement pattern image in which the first image and the second image are arranged at positions corresponding to a positional relationship between the moving object and the candidate position indicated by the selected candidate position image.

According to (2), it is possible to display the movement pattern image whose contents correspond to the positional relationship between the moving object and the candidate position indicated by the selected candidate position image. Accordingly, it is possible to display the movement pattern image that suits a sense of the user, and thus it is possible to prevent a sense of discomfort from being given the user due to the displayed movement pattern image.

(3) The control device according to (1) or (2), in which the display control unit displays the movement pattern image representing the executable movement pattern in such a manner that the movement pattern image representing the executable movement pattern is distinguished from a movement pattern image representing a movement pattern inexecutable by the moving object when the candidate position indicated by the selected candidate position image is set as the target position.

According to (3), since the movement pattern image representing the executable movement pattern can be displayed in such a manner that the movement pattern image representing the executable movement pattern is distinguished from the movement pattern image representing the inexecutable movement pattern, the user can be guided to the movement pattern image representing the executable movement pattern in an intuitive and easy-to-understand manner.

(4) The control device according to (3), in which the plurality of types of movement patterns include a first movement pattern (forward parking pattern) in which the moving object moves forward toward the target position and a second movement pattern (backward parking pattern) in which the moving object moves backward toward the target position, and when one movement pattern of the first movement pattern and the second movement pattern is the executable movement pattern and the other movement pattern is the inexecutable movement pattern, the display control unit displays a first movement pattern image (first parking pattern image GP1) representing the first movement pattern and a second movement pattern image (second parking pattern image GP2) representing the second movement pattern, and displays a movement pattern image representing the executable movement pattern among the first movement pattern image and the second movement pattern image in such a manner that the movement pattern image representing the executable movement pattern is distinguished from a movement pattern image representing the inexecutable movement pattern.

According to (4), the user can be guide in an easy-to-understand manner as to whether the moving object will move to the target position by moving forward or the moving object will move to the target position by moving backward.

(5) The control device according to (4), in which the plurality of types of movement patterns further include a third movement pattern (parallel parking pattern), the first movement pattern is a movement pattern in which the moving object is parked forward at the target position, the second movement pattern is a movement pattern in which the moving object is parked backward at the target position, and the third movement pattern is a movement pattern in which the moving object is parked parallelly at the target position, when the third movement pattern is the executable movement pattern, the display control unit displays a third movement pattern image (third parking pattern image GP3) representing the third movement pattern, and does not display the first movement pattern image and the second movement pattern image, and a display size of the third movement pattern image is different from a display size of the first movement pattern image and the second movement pattern image.

According to (5), the user can be guided in an easy-to-understand manner that the moving object is to be parked by parallel parking toward the target position.

(6) The control device according to any one of (1) to (5), in which the display control unit displays a bird eye view image (bird eye view image PS1) in which the moving object and a surrounding of the moving object are viewed from above, and displays the movement pattern image below the moving object in the bird eye view image.

According to (6), by displaying the movement pattern image below the moving object in the bird eye view image, the movement pattern image can be formed in such a manner that a limited display region is effectively utilized.

(7) The control device according to (6), in which the display control unit displays the bird eye view image in a region on one of left and right sides of a display screen of the display device, and displays a direction image (direction image PS2) including a landscape in a predetermined direction from the moving object in a region on the other of the left and right sides of the display screen, and the display control unit displays the movement pattern image in the region on the one side and below the moving object in the bird eye view image.

According to (7), by displaying the movement pattern image below the moving object in the bird eye view image on the side opposite to the region in which the direction image is displayed, the movement pattern image can be formed in such a manner that a limited display region is effectively utilized.

(8) A moving object including:
the control device according to any one of (1) to (7);
the display device; and
the external sensor, in which
the moving object is configured to be moved by automatic steering to the target position.

According to (8), when any one of the candidate position images is selected by the user, it is possible to display the movement pattern image representing a movement pattern executable by the moving object when the candidate position indicated by the candidate position image is set as the target position. Accordingly, the user can be guided to the movement pattern when the candidate position indicated by the selected candidate position image is set as the target position. Therefore, the user can grasp the movement pattern when the moving object moves to the target position specified by the user.

What is claimed is:

1. A control device configured to control a display device mounted on a moving object that is moved by automatic steering to a target position specified by a user, the moving object being configured to be movable according to a plurality of types of movement patterns, and moving according to a movement pattern corresponding to the target position among the plurality of types of movement patterns when moving to the target position, the control device comprising:

circuitry configured to
control display of a candidate position image, indicating a candidate position that is a candidate of the target position, on the display device when the candidate position is detected based on a detection result of an external sensor provided in the moving object; and receive an operation of selecting a candidate position image indicating a candidate position to be set as the target position from among a plurality of candidate position images when the plurality of candidate position images are displayed on the display device, wherein when any one of the candidate position images is selected, the circuitry controls display of a movement pattern image, representing the movement pattern executable by the moving object when the candidate position indicated by the candidate position image is set as the target position, on the display device, the movement pattern image includes a first image representing the candidate position and a second image representing the moving object, the circuitry controls display of the movement pattern image in which the first image and the second image are arranged at positions corresponding to a positional relationship between the moving object and the candidate position indicated by the selected candidate position image, and the circuitry controls display of a bird eye view image in which the moving object and a surrounding of the moving object are viewed from above, and display of the movement pattern image adjacent to the moving object in the bird eye view image.

2. The control device according to claim 1, wherein the circuitry controls display of the movement pattern image representing the executable movement pattern in such a manner that the movement pattern image representing the executable movement pattern is distinguished from a movement pattern image representing a movement pattern inexecutable by the moving object when the candidate position indicated by the selected candidate position image is set as the target position.

3. The control device according to claim 2, wherein:
the plurality of types of movement patterns include a first movement pattern in which the moving object moves forward toward the target position and a second movement pattern in which the moving object moves backward toward the target position; and when one movement pattern of the first movement pattern and the second movement pattern is the executable movement pattern and an other movement pattern of the first movement pattern and the second movement pattern is the inexecutable movement pattern, the circuitry controls display of a first movement pattern image representing the first movement pattern and a second movement pattern image representing the second movement pattern, and display of a movement pattern image representing the executable movement pattern among the first movement pattern image and the second movement pattern image in such a manner that the movement pattern image representing the executable movement pattern is distinguished from a movement pattern image representing the inexecutable movement pattern.

4. The control device according to claim 3, wherein:
the plurality of types of movement patterns further include a third movement pattern;
the first movement pattern is a movement pattern in which the moving object is parked forward at the target position;
the second movement pattern is a movement pattern in which the moving object is parked backward at the target position;
the third movement pattern is a movement pattern in which the moving object is parked parallelly at the target position;
when the third movement pattern is the executable movement pattern, the circuitry controls display of a third movement pattern image representing the third movement pattern, and does not control display of the first movement pattern image and the second movement pattern image; and a display size of the third movement pattern image is different from a display size of the first movement pattern image and the second movement pattern image.

5. The control device according to claim 1, wherein the circuitry controls display of the movement pattern image below the moving object in the bird eye view image.

6. The control device according to claim 5, wherein the circuitry controls display of the bird eye view image in a region on one of left and right sides of a display screen of the display device, and display of a direction image including a landscape in a predetermined direction from the moving object in a region on an other of the left and right sides of the display screen; and
the circuitry controls display of the movement pattern image in the region on the one side and below the moving object in the bird eye view image.

7. The control device according to claim 1, wherein the moving pattern image includes a plurality of different parking patterns.

8. A moving object comprising:
circuitry configured to
control a display device mounted on a moving object that is moved by automatic steering to a target position specified by a user, the moving object being configured to be movable according to a plurality of types of movement patterns, and moving according to a movement pattern corresponding to the target position among the plurality of types of movement patterns when moving to the target position,
control, when a candidate position that is a candidate of the target position is detected based on a detection result of an external sensor provided in the moving object, display of a candidate position image indicating the candidate position on the display device, and
receive an operation of selecting a candidate position image indicating a candidate position to be set as the target position from among a plurality of the candidate position images when the plurality of candidate position images are displayed on the display device;
the display device; and
the external sensor, wherein
when any one of the candidate position images is selected, the circuitry controls display of a movement pattern image, representing the movement pattern executable by the moving object when the candidate position indicated by the candidate position image is set as the target position, on the display device,
the moving object is configured to be moved by automatic steering to the target position,
the movement pattern image includes a first image representing the candidate position and a second image representing the moving object,
the circuitry controls display of the movement pattern image in which the first image and the second image are arranged at positions corresponding to a positional relationship between the moving object and the candidate position indicated by the selected candidate position image, and
the circuitry controls display of a bird eye view image in which the moving object and a surrounding of the moving object are viewed from above, and display of the movement pattern image adjacent to the moving object in the bird eye view image.

* * * * *